US012791530B2

(12) United States Patent
Lazzari et al.

(10) Patent No.: US 12,791,530 B2
(45) Date of Patent: Nov. 10, 2026

(54) METHOD FOR RECONSTRUCTING A THICKNESS PROFILE OF A PART TO BE TESTED

(71) Applicant: VALLOUREC TUBES FRANCE, Meudon (FR)

(72) Inventors: Olivier Lazzari, Meudon (FR); Jimmy Haoua, Meudon (FR)

(73) Assignee: VALLOUREC TUBES FRANCE, Meudon (FR)

( * ) Notice: Subject to any disclaimer, the term of this patent is extended or adjusted under 35 U.S.C. 154(b) by 324 days.

(21) Appl. No.: 18/682,537

(22) PCT Filed: Aug. 10, 2022

(86) PCT No.: PCT/EP2022/072421
§ 371 (c)(1),
(2) Date: Feb. 9, 2024

(87) PCT Pub. No.: WO2023/017070
PCT Pub. Date: Feb. 16, 2023

(65) Prior Publication Data

US 2024/0353375 A1 Oct. 24, 2024

(30) Foreign Application Priority Data

Aug. 12, 2021 (FR) ...................................... 2108669

(51) Int. Cl.
*G01N 29/26* (2006.01)
*G01N 29/04* (2006.01)
(Continued)

(52) U.S. Cl.
CPC ......... *G01N 29/262* (2013.01); *G01N 29/041* (2013.01); *G01N 29/4454* (2013.01);
(Continued)

(58) Field of Classification Search
CPC ............... G01N 29/262; G01N 29/041; G01N 29/4454; G01N 29/48; G01N 2291/011;
(Continued)

(56) References Cited

U.S. PATENT DOCUMENTS 6,522,288 B1 * 2/2003 Paradie .................. G01S 13/46 342/146
2008/0121040 A1 5/2008 MacLauchlan et al.
2011/0120223 A1 5/2011 MacLauchlan et al.

FOREIGN PATENT DOCUMENTS

DE 102018119206 A1 * 2/2020 ........... G01N 29/262
JP 2011-247649 A 12/2011

OTHER PUBLICATIONS

DE-102018119206-A1 (Year: 2020).*
International Search Report mailed on Nov. 2, 2022 in PCT/EP2022/072421 filed on Aug. 10, 2022, 2 pages).

* cited by examiner

*Primary Examiner* — Fatemeh Esfandiari Nia
(74) *Attorney, Agent, or Firm* — Oblon, McClelland, Maier & Neustadt, L.L.P.

(57) ABSTRACT

A method for reconstruction of a thickness profile of a part to be inspected including for distinct emission points: for a current emission point, emitting ultrasound firings, generating basic echo signals associated with a respective ultrasound firing, selecting a firing producing the basic echo signal of greatest amplitude, calculating for the selected firing a basic flight time, calculating the coordinates of a surface contact point for the selected firing, calculating a set of potential positions of the internal surface of the part to be inspected as a function of the basic flight time, the coordinates of the contact point of the external surface and a propagation medium in the part to be inspected, the method further including the step of calculating the profile of the
(Continued)

internal surface of the part to be inspected by joining separate portions of the sets of potential positions.

12 Claims, 3 Drawing Sheets

(51) Int. Cl.
*G01N 29/44* (2006.01)
*G01N 29/48* (2006.01)

(52) U.S. Cl.
CPC ....... *G01N 29/48* (2013.01); *G01N 2291/011* (2013.01); *G01N 2291/02854* (2013.01); *G01N 2291/044* (2013.01); *G01N 2291/106* (2013.01)

(58) Field of Classification Search
CPC ... G01N 2291/02854; G01N 2291/044; G01N 2291/106; G01N 29/043; G01N 2291/0258; G01N 29/07; G01B 17/02; G01S 13/878; G01S 13/46; G01S 13/726; G01S 2013/466; G01S 13/00–958
See application file for complete search history.

METHOD FOR RECONSTRUCTING A THICKNESS PROFILE OF A PART TO BE TESTED

TECHNICAL FIELD

The invention relates to the field of non-destructive testing such as non-destructive testing of the conformity of metal products. The invention relates more particularly to ultrasound inspection by reconstruction of the thickness profile of a part to be inspected.

TECHNOLOGICAL BACKGROUND

Metal tubes are widely used in various fields of the energy industry such as electrical power generation, petroleum and gas as well as in mechanical engineering. Like most metallurgical products, tubes are liable to include defects linked to their manufacture, such as dimension defects, inclusions of material in the steel, cracks on their internal or external surface, or porosity. Generally speaking, tubes must have precise dimensions and profiles in order to guarantee their mechanical strength in service.

Tubes are therefore inspected after manufacture to detect any defects therein but also, where appropriate, to determine information useful for evaluation of the hazard of those defects and the compliance of those tubes with standards.

For tubes having a profile the external and internal surfaces of which are parallel non-destructive testing techniques are used employing ultrasound waves in order to determine the actual geometry of the tube and to be sure that this actual geometry of the tube corresponds to the desired geometry, in particular in terms of thickness and eccentricity. To this end ultrasound waves are caused to propagate in the tube and, of the waves reflected by the tube, those that are representative of the geometry of the tube are determined.

However, for tubes having complex profiles in which the external and internal surfaces of the tube are not parallel, reflection of ultrasound waves on the external and/or internal surface of the tube does not allow direct use of the method used in the context of tubes the external and internal surfaces of which are parallel. In fact, if a wave arrives perpendicularly to the external surface and/or the internal surface of the tube it is reflected along the same trajectory by said surface. However, when the ultrasound wave arrives at an angle to the external surface and/or the internal surface of the tube it is reflected in accordance with a trajectory described by the Snell-Descartes law that does not correspond to a measurement of thickness. In the case of elements the external and internal surfaces of which are not parallel this makes the use of ultrasound waves to effect dimensional measurements problematic.

To avoid problems linked to the reflection of waves in the context of a tube having a complex thickness profile there is generally first determined the profile of the external surface of the tube, for example by means of ultrasound waves. A pantograph system is then generally used allowing manual identical reproduction of the internal profile of the tube. However, this type of device takes a long time to use and has an accuracy that is greatly dependent on the skill of the user of the pantograph.

Thus there exists a need for a complex tube thickness profile reconstruction method enabling data to be obtained representative of the profile of the internal surface in a rapid and reliable manner.

SUMMARY

One idea behind the invention is to enable the reconstruction of a thickness profile of a part to be inspected in a rapid and reliable manner. In particular, one idea behind the invention is to enable the reconstruction of the internal surface of a part to be inspected having complex shapes, typically having at least one portion in which the internal surface and the external surface are not parallel. Furthermore, one idea behind the invention is to enable this reproduction of the thickness profile by means of ultrasound waves despite the presence of external and internal surfaces that are not parallel.

To this end the invention provides a method for reconstruction of a thickness profile of a preferably metal part to be inspected, said part to be inspected having a first surface and a second surface, the method including, at a plurality of distinct emission points, the steps of:

- at a current emission point of the plurality of distinct emission points, emitting from a transducer a plurality of ultrasound firings in the direction of the first surface of the part to be inspected,
- the transducer receiving ultrasound waves during a time window;
- generating a plurality of basic echo signals, each basic echo signal being associated with a respective ultrasound firing, each basic echo signal corresponding to an ultrasound wave reflected by the second surface of the part to be inspected and received by the transducer,
- selecting a firing from the plurality of firings, said selected firing producing the basic echo of greatest amplitude of the basic echo signals,
- calculating for said selected firing a basic flight time corresponding to the time elapsed between the moment of transmission of said selected firing from the exterior to the interior of the part to be inspected and the moment of contact of said selected firing with the second surface of the part to be inspected,
- calculating the coordinates of a surface contact point for said selected firing, said coordinates including an axial coordinate along a longitudinal axis of the part to be inspected and a radial coordinate along a radial axis perpendicular to said longitudinal axis of the part to be inspected, said surface contact point corresponding to the point of impact of the selected firing on the first surface of the part to be inspected,
- calculating a set of potential positions of the second surface of the part to be inspected as a function of the basic flight time, the coordinates of the surface contact point and a propagation medium in said part to be inspected, the method further including the step of calculating the profile of the second surface of the part to be inspected by joining separate portions of the sets of potential positions of the second surface calculated for the plurality of distinct emission points.

Thanks to these features it is possible to reconstruct the profile of the second surface of the part to be inspected by means of ultrasound firings in a reliable and rapid manner. In particular, it is possible to reconstruct the profile of the second surface of the part to be inspected including when that second surface is not parallel to the first surface of the part to be inspected, that is to say in the context of a part having variations of thickness along it longitudinal axis.

The use of ultrasound firings enables rapid processing of the part to be inspected in order to determine the profile of its second surface. Furthermore, the generation of a plurality of ultrasound firings for each emission point enables the reconstruction of the profile of the second surface of the part to be inspected despite the presence of variations in the slope of said second surface. In particular, this plurality of ultrasound firings enables angular scanning so that at each emission position along the longitudinal axis of the part to be inspected it is possible to obtain information relating to the part by means of a firing the angular orientation of which, once transmitted into the part, is perpendicular to the second surface of the part to be inspected. For each position of the emission point it is therefore possible to obtain a set of potential positions of the second surface. Linking the separate portions of these sets then makes it possible to delimit the profile of the second surface, the use of these separate portions of the calculated sets of potential positions make it possible to determine the position of the second surface despite the absence of information on the orientation of the ultrasound firings.

Embodiments of a thickness profile reconstruction method of this kind may have one or more of the following features.

In accordance with one embodiment the or each ultrasound firing of the plurality of ultrasound firings has a respective emission angle preferably situated in an emission plane theta parallel to the longitudinal axis of the part to be inspected at a current emission time so as to generate for the current emission point an angular emission scan.

In accordance with one embodiment the step of reception by the transducer of the ultrasound waves is executed for a respective time window for one or more or each firing of the plurality of ultrasound firings. In accordance with one embodiment the step of reception by the transducer of the ultrasound waves is executed during the same time window for the plurality of distinct firings at the current emission point.

In accordance with one embodiment the reception by the transducer of the ultrasound waves is executed in such a manner as to receive waves reflected by the part to be inspected in response to the current firing of said plurality of firings.

The set of potential positions can take various forms. In accordance with one embodiment the set of potential positions of the second surface at each current emission point is continuous in such a manner as to form a circular arc, and the junction of the sets of positions includes the junction of the separate portions of said circular arcs.

In accordance with one embodiment the set of potential positions of the second surface for each current emission point is continuous in such a manner as to form a circle, the junction of the sets of positions includes the junctions of the separate portions of said circles.

In accordance with one embodiment the method further includes, for one, more or each emission point of the plurality of distinct emission points, the steps of:

- calculating basic intersection points between a straight line oriented radially and passing through said emission point and the sets of potential positions of the second surface calculated for the various emission points of the plurality of distinct emission points,
- selecting a basic intersection point from said calculated basic intersection points, said selected basic intersection point being the closest to the longitudinal axis of the part to be inspected, for example the one at the greatest distance from said emission point, of the calculated basic intersection points, said selected intersection point corresponding to the point on the second surface of the part to be inspected at the level of a straight line oriented radially and passing through the emission point, joining the sets of potential positions of the second surface includes joining the selected basic intersection points.

In accordance with one embodiment the selected firing is a first selected firing and the method further includes, for each firing of the plurality of firings at the current emission point, the steps of:

- generating a plurality of interface echo signals, each interface echo signal being associated with a respective ultrasound firing of the plurality of firings and each interface echo signal corresponding to an ultrasound wave reflected by the first surface of the part to be inspected and received by the transducer,
- selecting a second firing from the plurality of firings, said selected second firing producing the interface echo signal of greatest amplitude of the interface echo signals,
- calculating for said second selected firing an interface flight time corresponding to the time elapsed between the moment of emission of said second selected firing and the moment of contact of said second selected firing with the first surface of the part to be inspected,
- calculating a set of potential positions of the first surface of the part to be inspected as a function of the interface flight time, the coordinates of the current emission point and a propagation medium between the current emission point and the part to be inspected, the method further including the step of calculating the profile of the first surface of the part to be inspected by joining separate portions of the sets of potential positions of the first surface calculated for the plurality of distinct emission points.

Thanks to these features it is possible at the same time to reconstruct the first surface and the second surface of the part to be inspected based on the same series of distinct ultrasound firings. The method according to the invention therefore enables reconstruction of the thickness profile of the part to be inspected in a simple and rapid manner by means of the same series of ultrasound firings, whatever the respective orientations of the first and second surfaces and the precise orientation of the transducer in the direction of the part to be inspected.

In accordance with one embodiment the step of emitting a plurality of ultrasound firings is executed by means of the sensor, the method including a step of moving said sensor longitudinally, that is to say along the longitudinal axis of the part to be inspected, and radially, that is to say perpendicularly to the longitudinal axis of the part to be inspected.

In accordance with one embodiment a sensor of this kind is adapted to emit an ultrasound wave at the emission point and to receive ultrasound waves at said emission point, for example ultrasound waves resulting from reflection from the part to be inspected of ultrasound waves emitted by the sensor.

The method is therefore simple to execute since the same sensor enables both emission and reception of the ultrasound waves enabling analysis of the part to be inspected. Furthermore, the movement of this sensor enables simple and rapid determination of the thickness profile of the part to be inspected along the longitudinal axis of said part.

In accordance with one embodiment the sensor is mounted on a casing, said casing including bearing points, for example formed by the ends of arms mounted on said casing, maintained in contact with the first surface of the part to be inspected during the movement of the sensor. In accordance with one embodiment the sensor is centred on the casing so that the ultrasound firings emitted by the sensor during the steps of emission of ultrasound firings are emitted from the centre of rotation of the casing at a constant distance from said first surface of the part. In accordance with one embodiment the arms have a length determined so that the position of the sensor relative to the part to be inspected can be determined.

In accordance with one embodiment the sensor is positioned equidistantly from the points of contact with the first surface of the part to be inspected, for example equidistantly from the ends of the arms that form said bearing points.

Thanks to these features it is possible to move the sensor along the part to be inspected in a simple and reliable manner. In particular, thanks to a sensor of this kind and a casing of this kind carrying the sensor the orientation of the ultrasound scanning remains directed toward the part to be inspected. Furthermore, a casing of this kind enables a radial distance between the point of emission of the firings and the first surface of part to be inspected to be maintained substantially constant despite the slope variations of said first surface.

In accordance with one embodiment the ultrasound firings emitted from a respective emission point are emitted in accordance with an angular scan between 0° and 30° on either side of a straight line perpendicular to a face of the casing on which the sensor is mounted and passing through the emission point of said sensor. In accordance with one embodiment the ultrasound firings emitted at a respective emission point are emitted in accordance with an angular scan of 60°, 30° on either side of a straight line perpendicular to a face of the casing on which the sensor is mounted and passing through the emission point of said sensor, said straight line being for example parallel to the arms of casing. It is preferable to avoid an angular scan with too great an angle in order to prevent unwanted geometric echoes. This angular scan is therefore preferably executed over an angular range less than or equal to 30°, for example 2×15°, on either side of a straight line parallel to the arms of the casing. This angle is advantageously determined as a function of the theoretical or nominal geometry of the part to be inspected, being substantially equal to the maximum angle between the internal and external surfaces of said part.

Thanks to these features the scan is executed over an angle sufficiently large to be sure that the shortest distance between the emission point and the first surface of the part to be inspected is oriented at an angle contained within said angular scan. In particular, with ultrasound firings emitted from a sensor mounted on a casing as described hereinabove the orientation variations of the sensor are limited despite the variations of the external surface of the part to be inspected, which makes it possible to be sure that an angular scan as described hereinabove produces a firing in accordance with the orientation of the shortest distance between the sensor and the external surface of the part. Furthermore, this kind of angle makes it possible to be sure that at least one ultrasound firing is propagated in the part to be inspected with an orientation perpendicular to the second surface, including in the situation of a large angle between the slopes of the first and second surfaces.

In accordance with one embodiment the part is a part of complex shape featuring variations of an inside and/or outside diameter of said part along the longitudinal axis of said part.

In accordance with one embodiment the method further includes a step of application of a respective delay law for one, more or each firing of the plurality of firings emitted at the current emission point of the plurality of firings.

The application of a delay law advantageously enables generation of a plurality of firings in accordance with the angular scan described hereinabove for one, more or each firing of the plurality of firings.

The coordinates of one or more emission points can be obtained in various ways. In accordance with one embodiment the method further includes for one, more or each emission point a step of determination of the coordinates of said emission point of the plurality of firings. In accordance with one embodiment the coordinates of the emission points are pre-established, for example by a pre-established routing of the sensor that therefore defines the various successive positions of the emission points.

The coordinates of the emission points may be determined in numerous ways. In accordance with one embodiment the coordinates of the emission point are determined by means of a wire coder. A wire coder of this kind is preferably attached at a coordinate identical to that of the emission point of the sensor, preferably corresponding to the coordinates of the rotation point of the casing when the arms are held pressed against the first surface. In accordance with one embodiment coordinates of this kind are determined by consulting a database storing said coordinates as a function of the time elapsed since a starting time of the method. In accordance with one embodiment these coordinates are determined by means of a position sensor.

In accordance with one embodiment the method further includes a step of correction of the calculated flight times. Such correction may be carried out in numerous ways. In accordance with one embodiment such correction includes a step of comparison with an amplitude threshold in order to avoid the presence of noise in the determination of the basic echoes and/or interface echoes. In accordance with one embodiment such correction includes a step of offsetting the calculated amplitude for the basic echo and/or the interface echo by a predetermined wavelength. This offset is for example an offset of one half-wavelength if the first alternation of the stream of waves to exceed the detection threshold varies with the longitudinal position of the sensor because of the variation in the thickness of the part.

The method according to the invention can be applied to numerous types of parts to be inspected having a first surface and a second surface. The method according to the invention can therefore include a step of positioning the sensor outside a part to be inspected, for example a metal tube, the first surface then corresponding to the external surface of the part to be inspected, typically the external surface of the tube, and the second surface corresponding to the internal surface of the part to be inspected, typically the internal surface of the tube. In another embodiment the method includes a step of positioning the sensor inside a part to be inspected, for example a metal tube, the first surface then corresponding to the internal surface of the part to be inspected, typically the internal surface of the tube, and the second surface corresponding to the external surface of the part to be inspected, typically the external surface of the tube.

BRIEF DESCRIPTION OF THE FIGURES

The invention will be better understood and other aims, details, features and advantages thereof will become more clearly apparent in the course of the following description of particular embodiments of the invention provided by way of non-limiting illustration only and with reference to the appended drawings.

DESCRIPTION OF EMBODIMENTS

Metal tubes are widely used in various fields of the energy industry such as electrical power generation, petroleum and gas as well as in mechanical engineering. Because of the numerous constraints to which these metal tubes are subjected as much during installation thereof as during use thereof, they must meet strict standards in order to prevent any deterioration and/or any leaking into the environment. In particular these tubes must meet precise dimensional constraints, which makes it necessary to be sure that the profile of the tube corresponds correctly to the required profile.

Some tubes may have complex shapes with variations of their inside and/or outside diameter along a longitudinal axis. These variations of the internal and/or external diameter are not necessarily uniform and the internal surface of the tube and the external surface of the tube may have different slopes relative to the longitudinal axis of the tube. Tubes with complex shapes of this kind therefore have external and internal surfaces that are not necessarily parallel, which gives rise to variations of thickness along their longitudinal axis.

Knowing the thickness profile of tubes of complex shape makes it possible to ensure their compliance with the specifications. Now; a thickness profile of this kind proves difficult to measure.

The present invention enables reliable measurement by ultrasound of the thickness profile of parts to be inspected, for example a tube or a turbine, despite the fact that the two surfaces defining the thickness profile of the part to be inspected are not parallel. In particular, the present invention enables reconstruction of the thickness profile of a part to be inspected by means of a sensor and in a rapid and reliable manner, for example without necessitating any tank for inspection by immersion or complex/self-adapting delay laws.

In the description below and the figures the axis X corresponds to the longitudinal axis of the tubular element. By convention, the "radial" orientation is directed orthogonally to the axis X and the axial orientation is directed parallel to the axis X. The terms "external" and "internal" are used to define the relative position of an element with reference to the axis X and thus an element close to the axis X is qualified as internal as opposed to an external element situated radially at the periphery.

Figure 1:
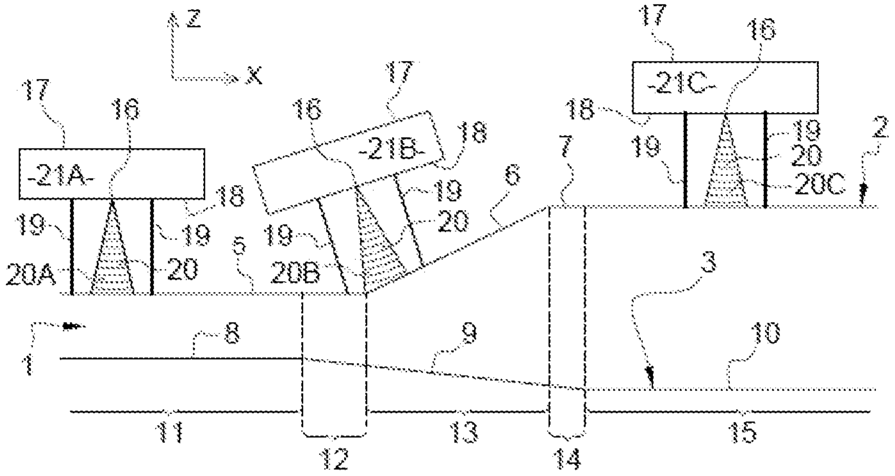
FIG. 1 is a schematic representation of a longitudinal section of a tubular element wall and of a casing including an ultrasound sensor, the casing being depicted at different positions along the tubular element.

FIG. 1 depicts schematically a tubular element wall 1 the profile of which must reconstructed, for example to verify its compliance with given specifications. This wall 1 has an external surface 2 and an internal surface 3 that conjointly define a thickness of the wall 1 along a longitudinal axis X of the tubular element.

The external surface 2 depicted in FIG. 1 includes successively from left to right in FIG. 1 a first portion 5 parallel to the longitudinal axis X, a second portion 6 at a positive angle $\alpha$ to the longitudinal axis X, and a third portion 7 parallel to the longitudinal axis X.

The internal surface 3 depicted in FIG. 1 has successively from left to right in FIG. 1 a first portion 8 parallel to the longitudinal axis X, a second portion 9 at a negative angle $\beta$ to the longitudinal axis X, and a third portion 10 parallel to the longitudinal axis X.

The first, second and third portion 5, 6 and 7, respectively, of the external surface 2 and 8, 9 and 10, respectively, of the internal surface 3 do not have the same lengths along the longitudinal axis X. Thus the wall 1 has successively from left to right in FIG. 1 a first section 11, a second section 12, a third section 13, a fourth section 14 and a fifth section 15. The first section 11 has a thickness delimited by the first portion 5 of the external surface 2 and the first portion 8 of the internal surface 3. The second section 12 has a thickness delimited by the second portion 6 of the external surface 2 and the first portion 8 of the internal surface 3. The third section 13 has a thickness delimited by the second portion 6 of the external surface 2 and the second portion 9 of the internal surface 3. The fourth section 14 has a thickness delimited by the third portion 7 of the external surface 2 and the second portion 9 of the internal surface 3. Finally, the fifth section 15 has a thickness delimited by the third portion 7 of the external surface 2 and the third portion 10 of the internal surface 3.

As depicted in FIG. 1 the external surface 2 and the internal surface 3 are parallel in the first section 11 and the fifth section 15. The thickness of the wall 1 is therefore constant in the first section 11 and the fifth section 15. Furthermore, the external surface 2 and the internal surface 3 are not parallel in the second section 12, the third section 13 and the fourth section 14. The thickness of the wall 1 therefore increases because of the angles $\alpha$ and/or $\beta$ in the second section 12, the third section 13 and the fourth section 14.

To reconstruct the thickness profile of the wall 1 a sensor 16 also referred to as a transducer is used. In the embodiment depicted in FIG. 1 this sensor 16 is a multi-element sensor 16 mounted on a casing 17. The casing 17 has a face 18 on which the sensor 16 is mounted.

The sensor 16 is configured to emit a plurality of ultrasound firings with distinct respective orientations by means of delay laws, for example as described in the document WO200350527A1. These delay laws enable the sensor 16 to execute this plurality of ultrasound firings in accordance with an angular scan depicted by the cone referenced 20 in FIG. 1. This kind of angular scan represents for example a 30° cone, for example of 15° on either side of a straight line perpendicular to the face 18 of the casing 17 and passing through the emission point of the sensor 16.

Furthermore, the casing 17 has two arms 19 of identical predetermined length projecting from the face 18 of the casing 17. These arms 19 extend perpendicularly to the face 18. The sensor 16 is equidistant from the arms 19.

A location device is also associated with the sensor 16 in order to determine the precise position of the sensor 16 longitudinally and radially and therefore to determine the precise coordinates of the emission point of the ultrasound firings. In a preferred embodiment this location device is a wire coder (not depicted) connected to the sensor 16 at precisely the same radial and longitudinal coordinates as the ultrasound emission point. Other location devices may nevertheless be used such as laser or other detectors.

In order to reconstruct the thickness profile of the wall 1 the sensor 16 is moved along the wall 1. To this end the casing 17 is positioned with the face 18 facing the wall 1 so that the sensor 16 able to emit ultrasound waves from this face 18 in the direction of the external surface 2 of the wall 1. Furthermore, the casing 17 is positioned so that the arms 19 bear on the external surface 2.

The casing 17 is then moved along the longitudinal axis X with the arms 19 held against the external surface 2. This maintained contact between the arms 19 and the external surface 2 causes the casing 17 to be more or less inclined relative to the longitudinal axis X as a function of the slope of the external surface 2 at the level of the bearing points between the arms 19 and the external surface 2, as depicted for example in FIG. 1 by three distinct positions 21A, 21B and 21C of the casing 17. The point of emission of the ultrasound firings by the sensor 16 corresponds to the rotation point of the casing 17 when said casing 17 is moved along the longitudinal axis X, the rotation point being imposed by a pivot connection between the casing 17 and a cell (not represented) enabling inspection by immersion of the part by the sensor 16.

For the various positions along the wall 1 the sensor 16 effects an ultrasound scan and the data resulting from the scans effected at these various positions is compiled to reconstruct the thickness profile of the wall 1.

For each position of the sensor 16 along the longitudinal axis X of the tubular element the sensor 16 therefore emits a plurality of ultrasound firings. Each ultrasound firing is emitted in the direction of the wall 1 with a respective orientation by means of a delay law: In other words, for a current position of the plurality of positions of the sensor 16 a plurality of ultrasound waves at respective angles are emitted in the direction of the wall 1 in such a manner as to form an angular scan 20 of ultrasound waves. FIG. 1 depicts an angular scan 20A, 20B and 20C effected at each of the three distinct positions 21A, 21B and 21C, respectively. This kind of angular scan 20 makes it possible to dispense with changes to the orientation of the sensor 16 relative to the external surface 2. In particular, this angular scan enables use of an ultrasound firing with an orientation perpendicular to the external surface 2 despite the rotation of the casing 17 as it moves along the external surface 2, for example because one of the arms 19 bears on the first portion 5 of the external surface 2 whereas the second arm 19 bears on the second portion 6 of the external surface 2 as depicted by the position 21B in FIG. 1. Likewise, this angular scan also makes it possible to be sure that at least one firing will impact the internal surface 3 in an orientation perpendicular to said internal surface 3 despite the fact that the orientation of the sensor 16 is independent of the slope of the internal surface 3 as for example in the second, third and fourth sections 12, 13 and 14 of the wall 1 depicted in FIG. 1.

Each current position also corresponds to a listening time window during which the sensor 16 receives the ultrasound waves. During this time window the sensor 16 therefore receives ultrasound waves resulting from the reflection of the various ultrasound firings emitted at said current position on the wall 1. The ultrasound waves received during this time window enable generation, for each firing of the plurality of firings emitted at the current position, of a respective A-Scan associated with the corresponding ultrasound firing of the plurality of firings emitted at this current position. A plurality of A-Scans representative of the wall 1 and each corresponding to a firing at a respective angle from the sensor 16 is therefore generated for each current position of the sensor 16.

In a preferred embodiment a single listening time window is used for all of the ultrasound firings effected for the current position of the sensor 16. An analysis of the received ultrasound waves enables the ultrasound waves received by the sensor 16 to be distinguished and generation of a respective A-Scan for each ultrasound firing. In a variant embodiment it is possible to provide for each ultrasound firing emitted a respective listening window and to generate the A-Scan corresponding to that firing for said listening window: The A-Scans are generated by remotely sited electronics connected to the sensor 16.

Figure 2:
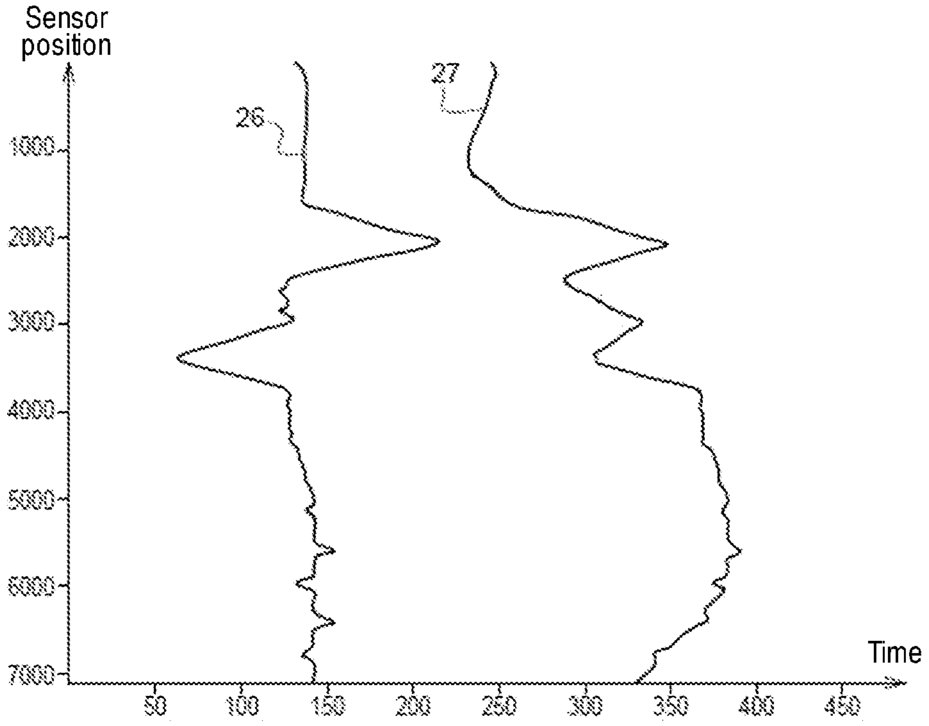
FIG. 2 is a graph depicting the interface and basic echoes depicting the tubular element from FIG. 1, said interface and basic echoes being generated by means of the casing from FIG. 1 during a movement of said casing along the tubular element.

In order to reconstitute the external surface of the wall 1 the set of A-Scans for each of the various positions of the sensor 16 is analysed. For each current position of the sensor 16 the A-Scan featuring a surface echo of greatest amplitude of the A-Scans generated for said current position of the sensor 16 is selected. This kind of surface echo corresponds to the reception by the sensor 16 of an ultrasound wave resulting from the reflection of the ultrasound firing corresponding to the A-Scan by the external surface 2. This A-Scan having the greatest surface echo amplitude represents the ultrasound firing emitted from the sensor 16 with an orientation perpendicular to the external surface 2. The angular scan and this selection of the A-Scan having the greatest surface echo amplitude make it possible to ignore the orientation of the sensor 16 relative to the external surface 2. As explained hereinafter FIG. 2 depicts the set of surface echoes 26 of the A-Scans selected for the various successive positions of the sensor 16 along the longitudinal axis X.

For each selected A-Scan a surface flight time is calculated. This surface flight time corresponds to the time elapsed between the emission of the ultrasound corresponding to the selected A-Scan and the impact of that ultrasound firing on the external surface 2. In other words, this flight time corresponds to the time elapsed between the emission by the sensor 16 of the ultrasound firing corresponding to the selected A-Scan and the reception by said sensor 16 of the surface echo corresponding to that selected ultrasound firing divided by two.

The surface distance between the current position of the sensor 16 determined by means of the wire sensor connected to the precise emission point of the sensor 16, that is to say to the rotation point of the casing 17 in the embodiment described hereinabove, and the external surface 2. This surface distance is calculated as a function of the surface flight time previously calculated or measured directly on the A-Scan as a function of the propagation medium between the sensor 16 and the external surface 2 and as a function of the speed of propagation of the ultrasound firing in said propagation medium.

Thus a surface distance of this kind is calculated for each current position. A surface circle 22 can then be traced for each current position of the sensor 16, this surface circle having as its centre the longitudinal and radial coordinates of the current position and as its radius the surface distance calculated for said current position. Thus FIG. 3 depicts a plurality of surface circles 22 for a corresponding plurality of successive current positions.

The external surface 2 corresponds to the joining of the separate portions of the surface circles 22 thus traced. In other words, the lower envelopes of these surface circles 22 that are not joined to other surface circles 22 represent the envelope of the external surface 2. In other words, the joining of the portions of the surface circles 22 that are not situated in other surface circles 22 represents the external surface 2 of the wall 1.

Figure 3:
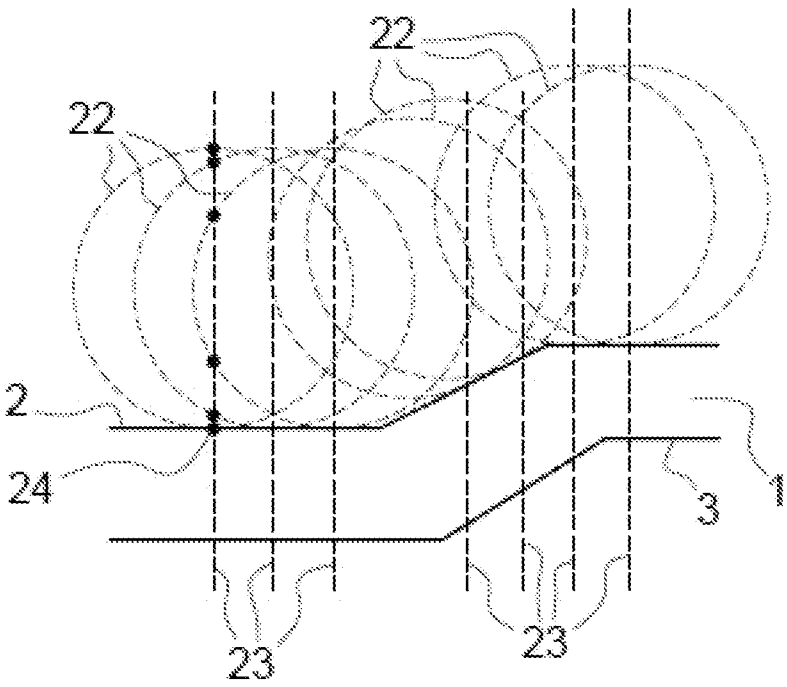
FIG. 3 is a schematic representation of a tubular element the profile of which is being reconstructed by means of an embodiment of the method according to the invention.

In accordance with a preferred embodiment and as depicted in FIG. 3, for each current position of the sensor 16 there is calculated a point of intersection between a vertical straight line 23 passing through the axial position of the sensor 16 at said current position of the sensor 16, that is to say along the longitudinal axis X, and each of the surface circles 22 calculated for the various positions of the sensor 16. The point of intersection on this straight line 23 closest to the longitudinal axis X, which is generally that at the greatest distance from the sensor 16, is then selected, this selected intersection point 24 corresponding to the position of the external surface 2 at the current axial position of the sensor 16. All the intersection points 25 selected for the various current positions of the sensor 16 are then connected together to form the geometry of the external surface 2.

The reconstruction of the internal surface 3 is based on angular scans 20 effected in substantially analogous manner to the reconstruction of the external surface 2 described hereinabove.

For each current position of the sensor 16 the A-Scan obtained having the basic echo with the greatest amplitude is selected. This kind of basic echo corresponds to the reception by the sensor 16 of the ultrasound wave resulting from the reflection from the internal surface 3 of the wall 1 of an emitted ultrasound firing corresponding to said A-Scan. This selected A-Scan having the greatest basic echo amplitude corresponds to the ultrasound firing of the plurality of ultrasound firings arriving with an orientation perpendicular to the internal surface 3. This selection of the A-Scan having the basic echo of greatest amplitude therefore makes it possible to ignore on the one hand the orientation of the sensor 16 relative to the longitudinal axis X and on the other hand the inclination of the internal surface 3 relative to the longitudinal axis X at the current position of the sensor 16. In an analogous manner to the surface echoes 26 corresponding to the A-Scans selected for reconstituting the external surface 2 as explained hereinabove, FIG. 2 depicts the set of basic echoes 27 corresponding to the various A-Scans selected as a function of the position of the sensor, on the vertical axis, and time, on the horizontal axis.

A basic flight time is calculated for each selected A-Scan. This basic flight time corresponds to the time elapsed between the emission of the ultrasound firing corresponding to the selected A-Scan by the sensor 16 and the reception by said sensor 16 of the basic echo.

A wall thickness is then calculated. This wall thickness is calculated as a function of the surface flight time, of the basic flight time, of the propagation medium in the wall 1, and of the speed of propagation of the ultrasound firing in said propagation medium of the wall 1.

To be more specific, a difference between the basic flight time and the surface flight time is calculated. This difference corresponds to the time elapsed between the impact of the ultrasound firing on the external surface 2 and the impact on the external surface 2 of the ultrasound wave reflected by the internal surface 3 and resulting from said ultrasound firing. This difference represents the propagation time of an ultrasound wave to pass to and fro through the wall 1. The thickness of the wall through which the ultrasound wave for the selected firing passes is then calculated by means on the one hand of this difference divided by two, to determine the propagation time of the ultrasound wave corresponding to the ultrasound firing selected to pass through the wall 1, and on the other hand the propagation medium in the wall 1 and the speed of propagation of an ultrasound wave in said propagation medium in the wall 1.

In a manner analogous to the method described hereinabove for the reconstitution of the external surface 2 the calculated thickness of the wall enables reconstruction of the internal surface 3 by internal surface circles the radius of which corresponds to the calculated thickness and the centre of which is located on the external surface 2 reconstructed previously.

To this end the point of impact on the external surface of the ultrasound firing corresponding to the selected A-Scan, that is to say the A-Scan having the greatest basic echo, must be calculated. This impact point is calculated as a function of the surface echo of said selected A-Scan, which makes it possible to obtain the distance travelled by the ultrasound scan between the sensor 16 and the external surface 2, for example in a manner analogous to the calculation of the distance described hereinabove for the reconstruction of the external surface 2. The point of impact of the ultrasound firing corresponding to the selected A-Scan is then calculated as corresponding to the point of intersection between on the one hand a circle the centre of which is the emission point of the sensor 16 and the radius of which is said calculated distance travelled and on the other hand the external surface 2 the profile of which has been reconstructed previously.

The situation where, for the same selected A-Scan, two potential impact points of the ultrasound firing corresponding to said A-Scan on the external surface 2 are obtained is not a problem. In fact, the selected A-Scan has a known angle of the firing from the sensor 16 and so it is possible to know to which of the two possible potential impact points it corresponds.

In an analogous manner to the reconstruction of the external surface 2, the reconstruction of the internal surface 3 is carried out by connecting the separate portions, that is to say the portions that do not overlap, of the internal surface circles calculated for the various successive positions of the sensor 16.

In a preferred embodiment, for each current position of the sensor 16 there is calculated the set of points of intersection between on the one hand a radial axis passing through the current position of the sensor 16 and on the other hand the set of internal surface circles calculated for the various positions of the sensor 16. In this set of points of intersection the point of intersection closest to the longitudinal axis X, generally corresponding to the point at the greatest distance from the sensor 16, is then selected and corresponds to the position of the internal surface 3 for the current axial position of the sensor 16. The set of points of intersection selected at the various positions of the sensor 16 are then connected to form the profile of the internal surface 3.

Figure 4:
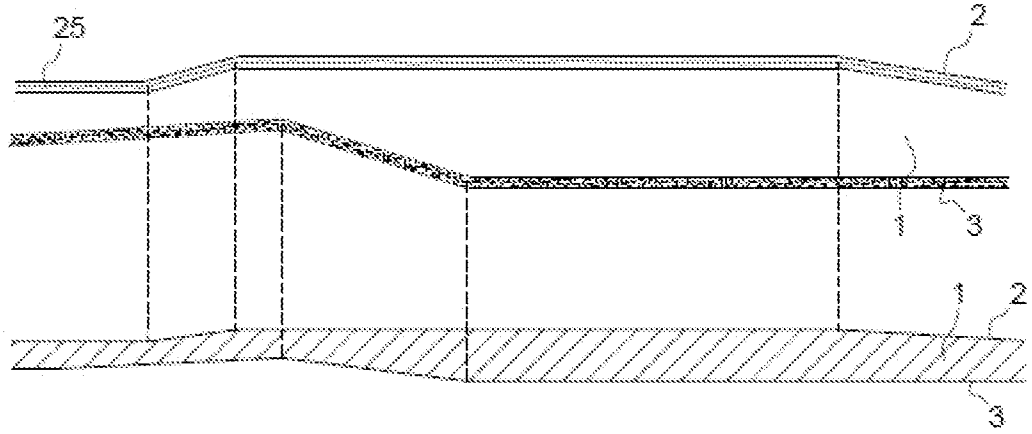
FIG. 4 is a schematic illustration depicting the reconstruction of the thickness profile obtained by means of an embodiment of the method according to the invention by comparison with the part to be inspected the thickness profile of which is reconstructed.
Figure 5:
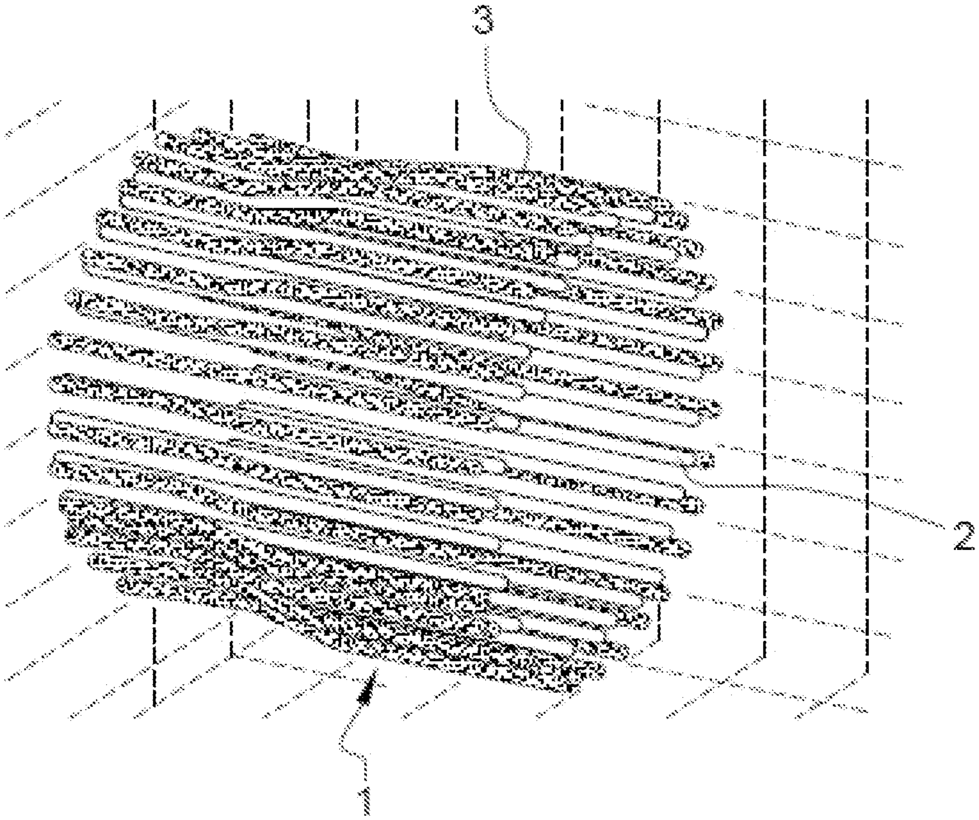
FIG. 5 is a schematic representation in three dimensions obtained by means of the FIG. 4 thickness profile reconstruction method and applied in accordance with distinct circumferential orientations of the part to be inspected.

By reconstructing the profile of the external surface 2 and of the internal surface 3 in this way a reconstruction of the thickness profile of the wall 1 is obtained as shown for example by FIG. 4 which depicts the thickness profile of the wall 1 in the lower part of said FIG. 4 compared to the profile of the wall 1 as reconstituted by means of the method described hereinabove in the upper part of said FIG. 4. This reconstruction in a section plane can be effected all around the tubular element to obtain an image in three dimensions of the thickness profile of the wall 1 of the tubular element as depicted in FIG. 5.

This method for reconstruction of the thickness profile advantageously makes it possible to obtain a profile of the thickness of the wall 1 using a sensor 16 moving along the longitudinal axis X and the orientation of which relative to said longitudinal axis X may vary during said movement, rendering the method easy to industrialise. Furthermore, the fact that the point of rotation of the casing 17 and the emission point of the sensor 16 are superposed allows the sensor to effect a rotation on the slope of the external surface 2 without this affecting the result.

In the embodiment described hereinabove the ultrasound firings are used to reconstruct both the external surface 2 and the internal surface 3. This advantageously makes it possible during a single movement of the casing 17 along the wall 1 to obtain all of the information enabling reconstruction of the thickness profile of the wall 1. Nevertheless, the method described hereinabove could be used to reconstruct the profile of the internal surface 3 alone, for example obtaining the profile of the external surface 2 by some other method and using the information on that profile of the external surface to calculate the profile of the internal surface 3 by the method described hereinabove.

Likewise, the method is described hereinabove in the context of a casing 17 bearing on the external surface 2 of the tubular element. Nevertheless, the casing could also be positioned in the tubular element, for example a tubular element having a large inside diameter, to determine successively first the profile of the internal wall 3 and then the profile of the external wall 2, that is to say in the opposite order to that described hereinabove when the casing 17 bears on the external surface 2. A casing 17 of this kind positioned in the tubular element would then be held pressed against the internal surface 3 with its face 18 having the sensor 16 facing toward the internal surface 3.

The invention claimed is:

1. A method for reconstruction of a thickness profile of a part to be inspected, said part to be inspected having a first surface and a second surface, the method comprising moving a transducer between a plurality of distinct emission points;

the method further comprising, at the plurality of distinct emission points, the steps of:

at a current emission point of the plurality of distinct emission points, emitting from a transducer a plurality of ultrasound firings in a direction of the first surface of the part to be inspected;

the transducer receiving ultrasound waves during a time window;

generating a plurality of basic echo signals, each basic echo signal being associated with a respective ultrasound firing, each basic echo signal corresponding to an ultrasound wave reflected by the second surface of the part to be inspected and received by the transducer;

selecting a firing from the plurality of firings, said selected firing producing the basic echo of greatest amplitude of the basic echo signals;

calculating for said selected firing a basic flight time corresponding to the time elapsed between a moment of transmission of said selected firing from an exterior to an interior of the part to be inspected and a moment of contact of said selected firing with the second surface of the part to be inspected;

calculating coordinates of a surface contact point for said selected firing, said coordinates including an axial coordinate along a longitudinal axis of the part to be inspected and a radial coordinate along a radial axis perpendicular to said longitudinal axis of the part to be inspected, said surface contact point corresponding to the point of impact of the selected firing on the first surface of the part to be inspected;

calculating a set of potential positions of the second surface of the part to be inspected as a function of the basic flight time, the coordinates of the surface contact point and a propagation medium in said part to be inspected;

calculating the profile of the second surface of the part to be inspected by joining separate portions of the sets of potential positions of the second surface calculated for the plurality of distinct emission points.

2. The method according to claim 1 for reconstruction of the thickness profile of a part to be inspected, in which the set of potential positions of the second surface is continuous in such a manner as to form a circle, joining the sets of positions including joining the separate portions of said circles.

3. The method according to claim 1 for reconstruction of the thickness profile of a part to be inspected, further including, for the plurality of distinct emission points, the steps of:

calculating basic intersection points between a straight line oriented radially and passing through said emission point and the sets of potential positions of the second surface calculated for the various emission points of the plurality of distinct emission points;

selecting a basic intersection point from said calculated basic intersection points, said selected basic intersection point being the closest to the longitudinal axis of the part to be inspected of the calculated basic intersection points, said selected intersection point corresponding to the point on the second surface of the part to be inspected at a level of a straight line oriented radially and passing through the emission point;

joining the sets of potential positions of the second surface includes joining the selected basic intersection points.

4. The method according to claim 1 for reconstruction of the thickness profile of a part to be inspected, in which the selected firing is a first selected firing and the method further includes, for each firing of the plurality of firings at the current emission point, the steps of:

generating a plurality of interface echo signals, each interface echo signal being associated with a respective ultrasound firing of the plurality of firings and each interface echo signal corresponding to an ultrasound wave reflected by the first surface of the part to be inspected and received by the transducer;

selecting a second firing from the plurality of firings, said selected second firing producing the interface echo signal of greatest amplitude of the interface echo signals;

calculating for said second selected firing an interface flight time corresponding to the time elapsed between a moment of emission of said second selected firing and the moment of contact of said second selected firing with the first surface of the part to be inspected;

calculating a set of potential positions of the first surface of the part to be inspected as a function of the interface flight time, the coordinates of the current emission point and a propagation medium between the current emission point and the part to be inspected;

the method further including the step of calculating the profile of the first surface of the part to be inspected by joining separate portions of the sets of potential positions of the first surface calculated for the plurality of distinct emission points.

5. The method according to claim 1 for reconstruction of the thickness profile of a part to be inspected, in which the step of emitting a plurality of ultrasound firings from the transducer is carried out with a sensor, the moving the transducer between the plurality of distinct emission points including a step of moving said sensor longitudinally and radially.

6. The method according to claim 5 for reconstruction of the thickness profile of a part to be inspected, in which the sensor is mounted on a casing, said casing including bearing points maintained in contact with the first surface of the part to be inspected during the moving the sensor, the sensor being centered on the casing so that the ultrasound firings emitted by the sensor during steps of emitting ultrasound firings are emitted from the center of rotation of the casing at a constant distance from said first surface of the part.

7. The method according to claim 6 for reconstruction of the thickness profile of a part to be inspected, in which the ultrasonic firings emitted at a respective emission point are emitted in accordance with angular scan of between 0° and 30° inclusive on either side of a straight line perpendicular to a face of the casing on which the sensor is mounted and passing through the emission point of said sensor.

8. The method according to claim 1 for reconstruction of the thickness profile of a part to be inspected, in which the part is a part of complex shape including variations of an inside diameter and/or of an outside diameter of said part along the longitudinal axis of said part.

9. The method according to claim 1 for reconstruction of the thickness profile of a part to be inspected, further including a step of applying a respective delay law for a firing of the plurality of firings emitted for the current emission point of the plurality of ultrasound firings.

10. The method according to claim 1, for reconstruction of the thickness profile of a part to be inspected, further including the steps of determining the coordinates of the emission point of the plurality of firings.

11. The method according to claim 10 for reconstruction of the thickness profile of a part to be inspected, in which the coordinates of the emission point are determined with a wire coder.

12. The method according to claim 1 for reconstruction of the thickness profile of a part to be inspected, further including the steps of correction of the calculated flight times.

* * * * *